United States Patent [19]

Sanchez

[11] Patent Number: 5,693,242
[45] Date of Patent: Dec. 2, 1997

[54] CONVECTION AIR OVEN

[76] Inventor: Francisca Sanchez Sanchez, c/o Baldomero Sola, 156 Badalona 08912 (Barcelona), Spain

[21] Appl. No.: 454,120
[22] PCT Filed: Oct. 4, 1994
[86] PCT No.: PCT/EP94/03277
§ 371 Date: Jun. 5, 1995
§ 102(e) Date: Jun. 5, 1995
[87] PCT Pub. No.: WO95/09533
PCT Pub. Date: Apr. 13, 1995

[30] Foreign Application Priority Data

Oct. 6, 1993 [ES] Spain .................... 9302104
Feb. 10, 1994 [ES] Spain .................... 9400249

[51] Int. Cl.⁶ .................................................. A21B 1/26
[52] U.S. Cl. ............................... 219/400; 126/21 A
[58] Field of Search ........................... 219/385, 386, 219/400; 126/21 A, 21 R; 34/219, 224, 225

[56] References Cited

U.S. PATENT DOCUMENTS

| 1,884,843 | 10/1932 | Petersime | 219/400 |
| 1,961,143 | 6/1934 | Gehnrich | 34/224 |
| 3,160,153 | 12/1964 | Drayer | 126/21 A |
| 3,889,099 | 6/1975 | Nuss | 126/21 A |
| 4,039,278 | 8/1977 | Denholm | 126/21 A |
| 4,250,955 | 2/1981 | Plattner et al. | 219/400 |
| 4,484,063 | 11/1984 | Whittenburg et al. | 219/400 |
| 4,660,540 | 4/1987 | Schroder | 126/21 A |
| 5,129,384 | 7/1992 | Parks | 126/21 A |
| 5,361,686 | 11/1994 | Koopman | 126/21 A |

Primary Examiner—Teresa J. Walberg
Assistant Examiner—J. Pelham
Attorney, Agent, or Firm—Finnegan, Henderson, Farabow, Garrett, and Dunner, L.L.P.

[57] ABSTRACT

Convection air oven comprising a polygonal base housing, preferably rectangular-shaped, forming an internal cavity which constitutes the cooking chamber, which is provided with a rotating plate and is open on two of its opposite sides, defined by two opposite facing walls, one of which incorporates a circulating air inlet leading to heater means wherein the air is heated and impelled via impeller means to an overhead duct fitted on the ceiling of the cooking chamber, said duct communicating with a cavity located behind the opposite wall of the cooking chamber which is provided with a series of central, vertically extending, dimensionally adjustable grooves through which the hot air emerges to be distributed throughout the interior of the cooking chamber.

10 Claims, 6 Drawing Sheets

CONVECTION AIR OVEN

This invention is related to a convection air oven of the type comprising a polygonal base housing, inside of which is defined a cavity which constitutes the cooking chamber, provided with a rotating plate and incorporating heater and impeller means for the internal circulation of hot air.

Air convection ovens are known to exist which normally pose a number of problems resulting in low efficiency and high power consumption; this is a result of deficient utilization, for various reasons, of the heat generated by the heater means.

One of the problems involving deficient power utilization is a result of the configuration of the cooking chamber, generally comprising a rectangular or quadrangular base receptacle with cold air accumulating corners which the circulating hot air is unable to reach, thereby making it difficult to achieve uniform heating of the cooking chamber, in addition to the extended heating time required.

Another factor involved in the poor utilization of the originated heat is determined by the disposition of the circulating air outlets leading to the heater means; it is evident that the hot air tends to rise by itself and therefore if hot air outlets are provided reaching up to the total height of the cooking chamber, said circulating hot air fails to be retained inside the chamber, thereby failing to take advantage of the heat as it emerges rapidly towards the heater means and thus provides a very poor heat utilization.

Another problem generally affecting air convection ovens is the emission of steam to the exterior, in view that certain phases of the cooking process require that steam be incorporated to the chamber which is then released to the exterior together with the hot air.

The convection air oven of this patent presents, among other novel aspects, two inlets into the cooking chamber, disposed in two opposite sides of the oven and having two peripheral frames around them through which emerge hot and ambient temperature, internal and external air screens, respectively.

The two walls of the cooking chamber present, in their central areas, recessed trapezoid shaped voids delimited by sides which converge towards the internal area of the walls and which conform a guide means for the hot air, both at the air entry into and exit from the cooking chamber, thus eliminating the corners and the accumulation of cold air inside the chamber, contributing to a better utilization of the heat and allowing for a faster temperature buildup in the chamber.

One of the walls encloses the heater means, and its recessed center surface comprises, in its upper portion, a humidifying chamber attached to the heater means, and in its lower portion a circulating air inlet directed to the heater means in such a manner that the circulating hot air is made to descend before being reheated and impelled once again, thereby providing very high performance with power consumption equivalent to 50% of that of a conventional oven.

The hot air passes through this lower outlet towards the heater means as a result of the suction created by the impeller means disposed above the heater means and composed of a single turbine which impels the preheated air through an overhead duct located in the oven ceiling which then passes on to a cavity located behind the opposite wall of the cooking chamber.

This opposite wall, which presents in its central recessed area a series of vertically extending grooves through which the hot air exits and is then distributed throughout the interior of the cooking chamber, also presents two other adjustable amplitude outlets which slightly converge towards the interior of the chamber and through which emerge peripheral hot air streams.

The wall of the cooking chamber closer to the heater means is fitted, adjacent to the chamber inlets, with vertical adjustable magnitude outlets communicating with the overhead duct through duct branches, the emerging hot air defining hot air streams which act on the sides of the main stream coming from the other wall and which circulates in the opposite direction and guides it, with the help of the suction originated by the impeller means, towards the inlet leading to the heater means disposed in the lower central area of said wall.

This disposition allows the outlets through which the hot air enters the cooking chamber, and which create a main cooking stream, to face the air inlet leading to the heater means, disposed in the opposite wall, said main stream moving equidistant to the two oven inlets and preventing it from acting on the hot air peripheral streams originated in the inner side of the chamber inlets.

Furthermore, all hot air outlets are provided with amplitude adjustment means, thereby allowing the hot air propeller means to be limited to a single turbine and providing independent variation of the air steam speeds generated.

All the vertically disposed hot air outlets comprise a fixed side and a movable side, thus allowing the amplitude of each to be adjusted independently; furthermore, both the fixed and the movable sides have a protruding fin extending throughout their length which determines the direction of the emerging air.

The oven inlets are provided with an exterior frame with vertical grooves which face each other—the amplitudes of which are adjustable in a manner similar to that of the hot air grooves—through which air at ambient temperature emerges, impelled by the turbines to define air curtains after emerging through said grooves.

The oven inlets are provided with transparent protection plates located preferably between the peripheral hot air outlets and the ambient temperature air outlets, the latter being oriented slightly towards the interior of the oven, the air at ambient temperature sweeping the external surface of the plates and thus preventing, on the one hand, entry of air at ambient temperature inside the cooking chamber, thereby lowering the temperature in the chamber and, on the other, preventing the protection plates from becoming overheated.

These protection plates may be optionally disposed along the exterior side of the ambient temperature air outlets, in which case they are oriented slightly towards the exterior, the ambient temperature air sweeping the inner side of the outlets.

The oven is controlled through an electric control panel which causes the hot air impeller turbine to stop automatically, for a preset period of time, immediately after steam is generated inside the humidifying chamber, thereby causing the steam particles to be deposited by their own weight inside the chamber, no longer being suspended and preventing them from being transported by the circulating hot air, thus eliminating virtually completely the emission of steam to the exterior.

To better understand the object of the present invention, the attached drawings illustrate a preferred practical embodiment of a convection air oven similar to the one disclosed herein. In said drawings.

Figure 1:
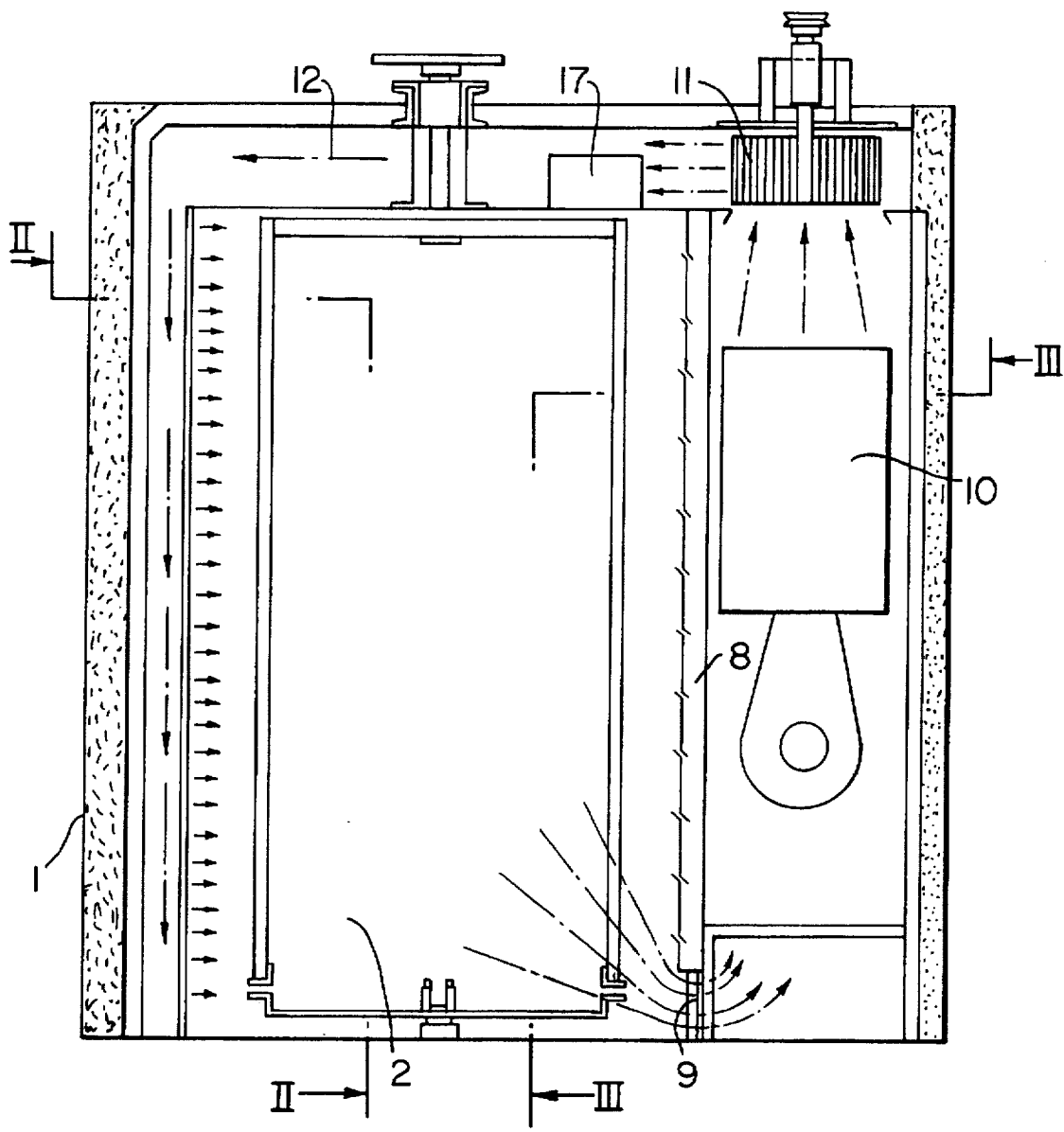
FIG. 1 shows an elevated sectional view through a vertical plane of the air convection oven.
Figure 2:
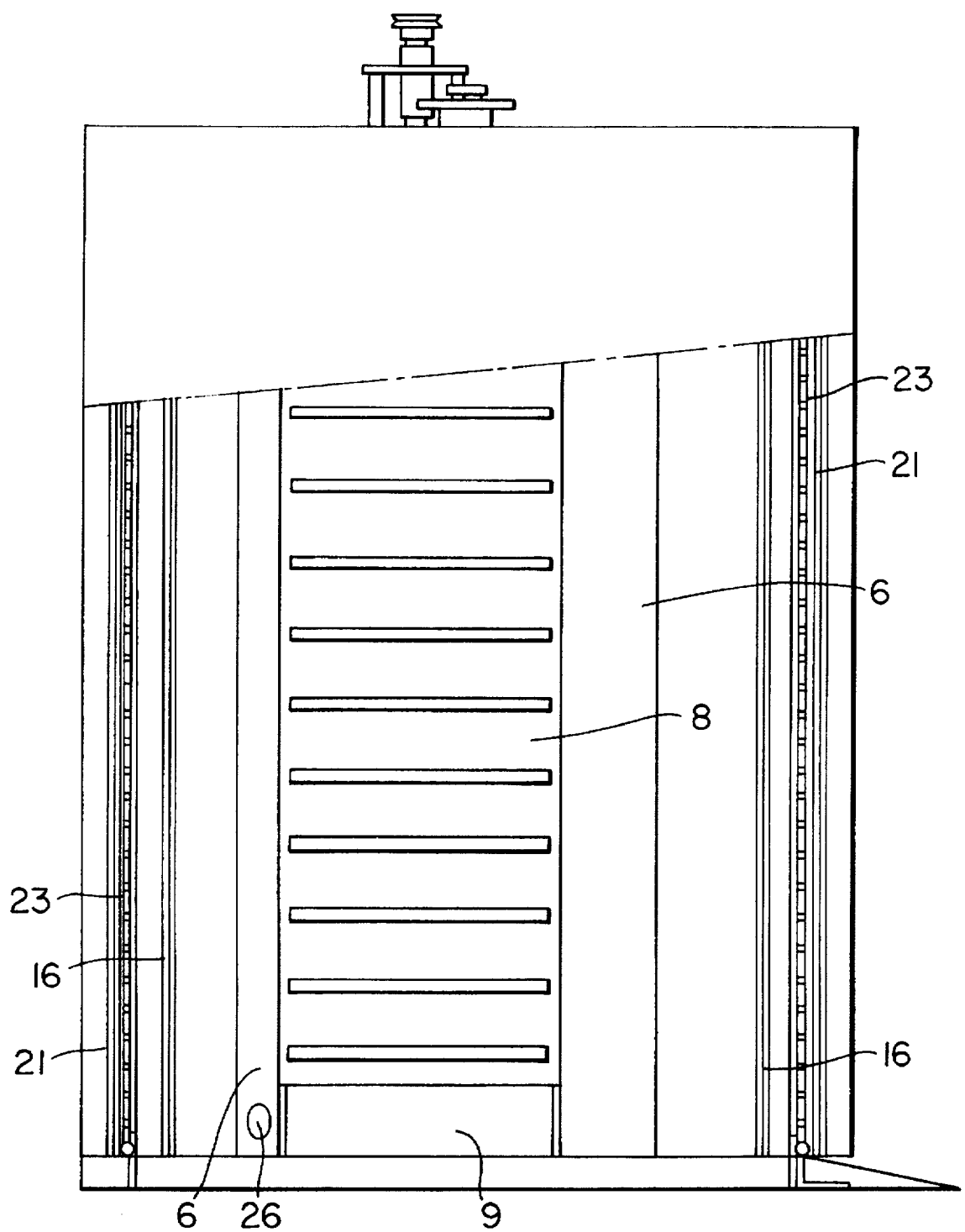
FIG. 2 shows a profile view of the oven, in which a lower portion of one side has been removed through section III.
Figure 3:
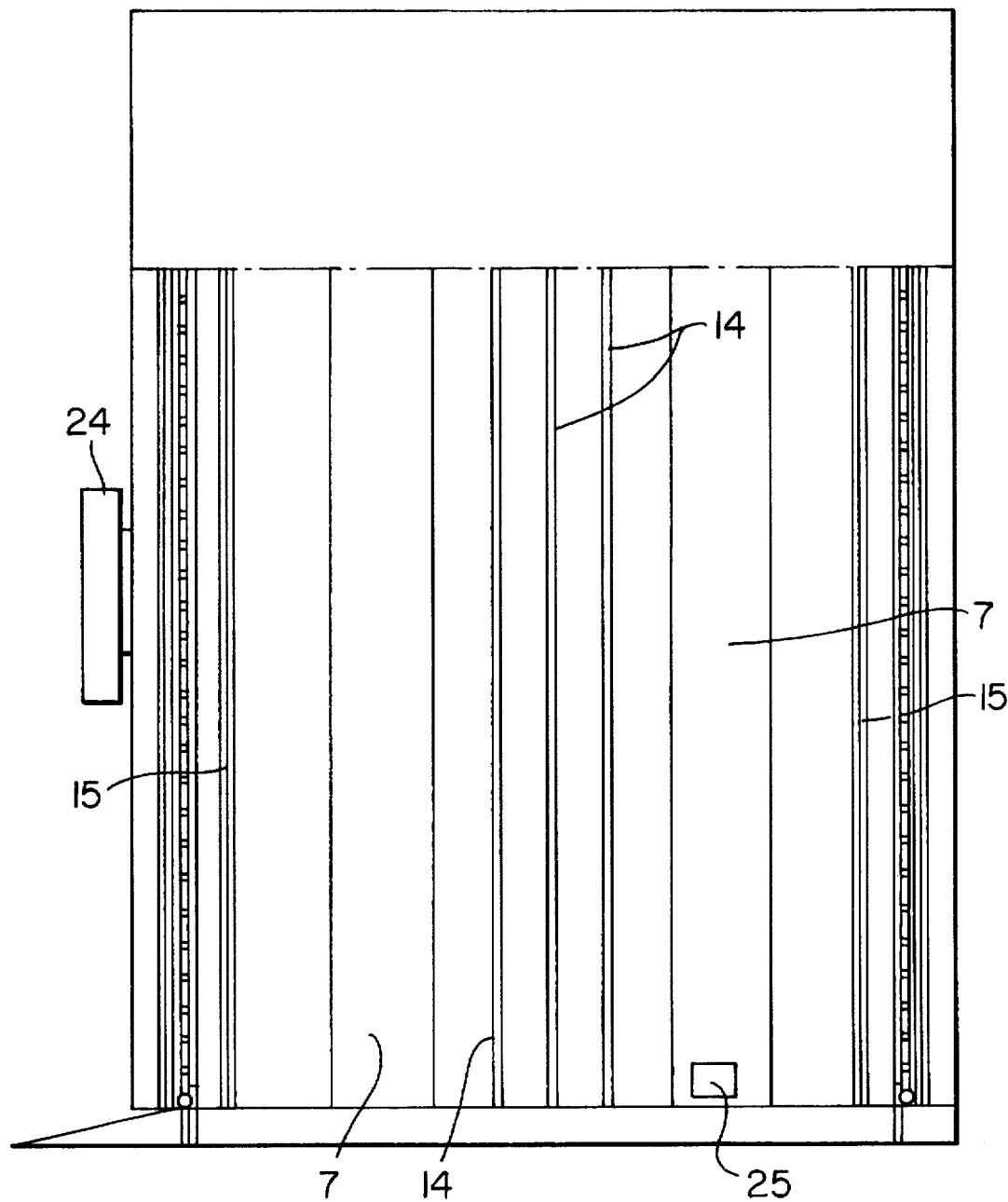
FIG. 3 shows a profile view of the oven, in which a lower portion of the opposite side has been removed through section II.

As can be seen from the above figures, the convection air oven comprises a housing (1) of a prismatic configuration which defines an internal cooking chamber (2) delimited by two opposite inlets (3) and by two opposite walls (4) and (5).

Walls (4) and (5) present prismatic-shaped recesses of a trapezoidal base, delimited respectively by chamfers (6) and (7) which replace the corners in order to avoid cold air accumulation within them.

The central area of wall (4), recessed and delimited by chambers (6), is formed by an upper portion comprising a humidifying chamber (8) and a lower portion, under the chamber, provided with a hole (9) through which passes the hot air circulating from the cooking chamber (2) towards the heater means, composed of a heater (10) located behind the wall (4), to which the humidifying chamber (8) is attached.

Above the heater (10), on the oven ceiling, a turbine (11) is provided which constitutes the means of impelling the hot air and is designed to suck the hot air from the cooking chamber (2), extracting it through the outlet (9) and impelling it through an overhead duct (12) after heating it in the heater (10).

The overhead duct (12) goes across the oven ceiling toward the opposite side, where it couples on to a cavity (13) located behind the wall (5) and spanning virtually the whole width of the oven.

Said wall (5) presents, in its recessed central surface delimited by side chamfers (7), several vertically disposed outlets (14) through which the hot air emerges from the cavity (13), impelled by the turbine (11), giving origin to a main stream of hot air. The wall (5) is fitted on both its sides, at the confluence with the inlets (3), with vertical outlets (15) through which the hot air from the cavity (13) emerges; said outlets define peripheral streams which converge slightly towards the inner area of the cooking chamber and delimit the circulation area of the main hot air stream, driving it, with the help of the chamfers (6) and (7), towards the central area of the opposite wall (4) in order to be sucked once again by the turbine (11), thereafter emerging from the cooking chamber through outlet (9).

Wall (4) also presents, close to one of the inlet sides (3), vertical outlets (16) associated to ducts (17) and composed of overhead duct (12) branches through which peripheral hot air streams emerge, converging slightly towards the inner zone of the cooking chamber.

Figure 4:
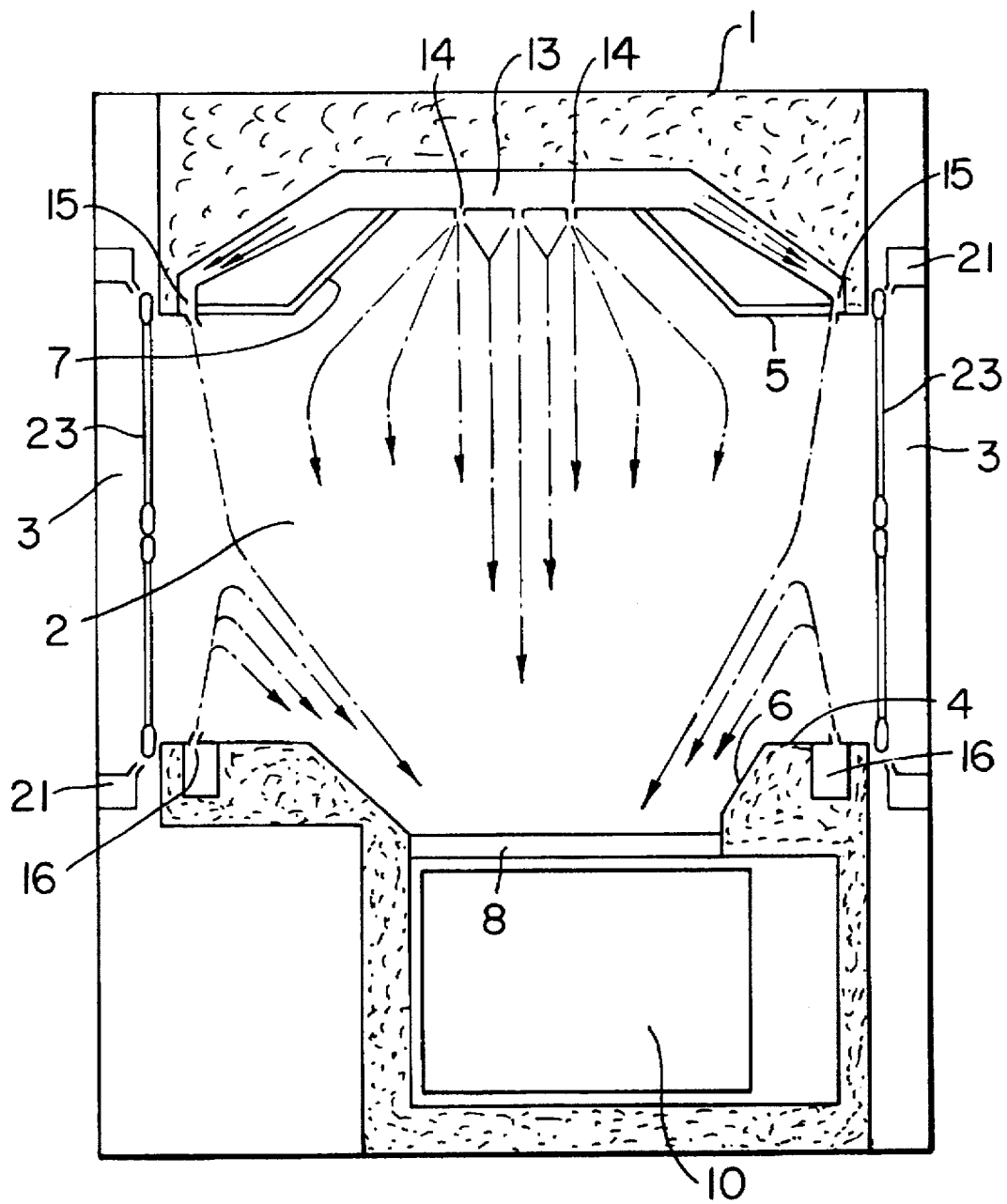
FIG. 4 shows a plane view of the oven, sectioned mid-height by a horizontal plane and illustrating the circulation of the hot air flow inside the chamber.
Figure 5:
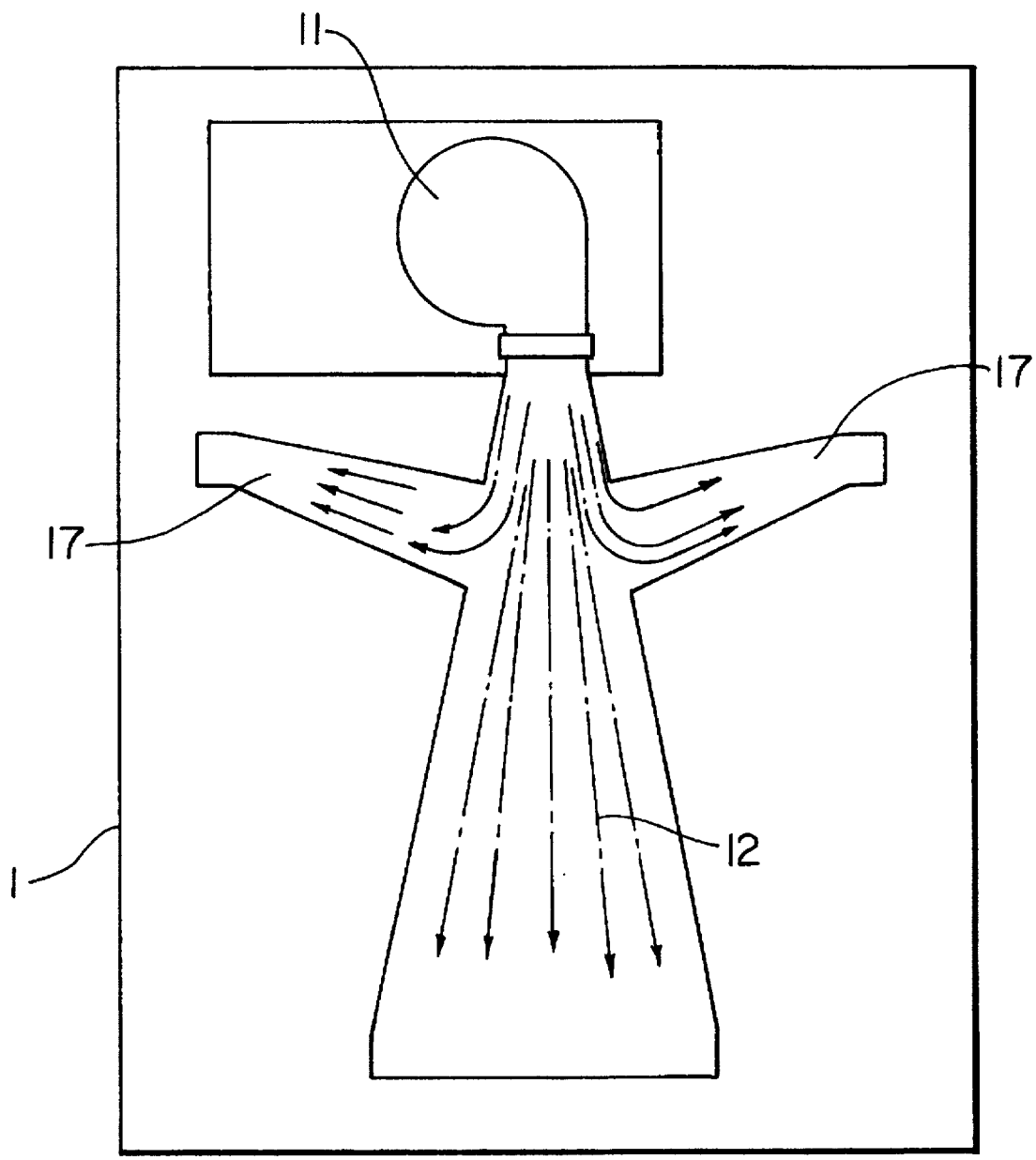
FIG. 5 shows a top view of the oven, in which the hot air circulation overhead duct can be seen coupled to the turbine volute.
Figure 6:
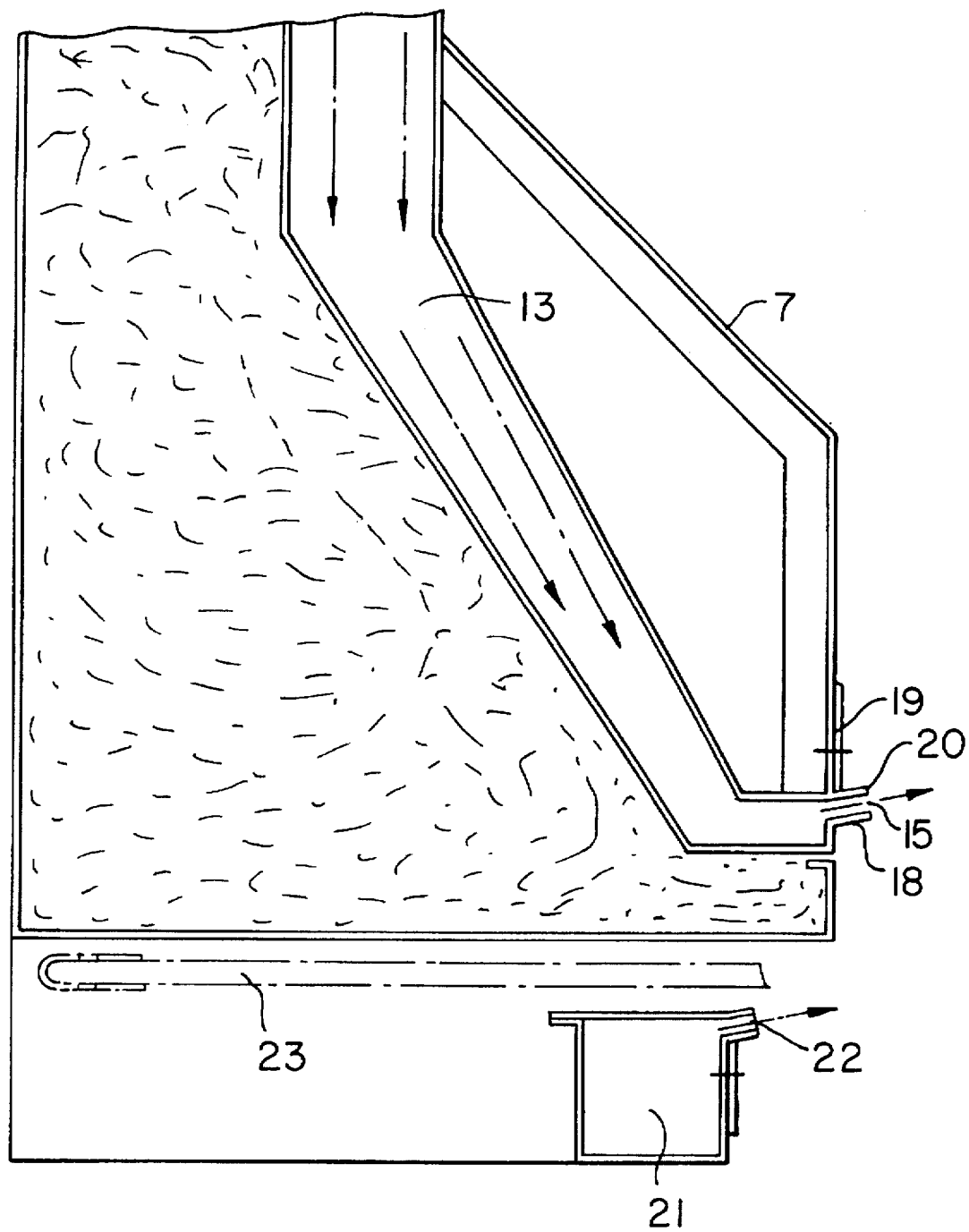
FIG. 6 shows a plan detail view of one of the oven corners, sectioned by a horizontal plane and illustrating the air outlet adjusting means.

The peripheral streams of hot air emerging through the outlets (16) perform a short circuit and then return towards the central area of the wall (4), as a result of the suction from turbine (11), thus collaborating in guiding the peripheral streams towards the central area of the wall (4); this flow is illustrated in FIG. 4 by means of arrows showing hot air circulation inside the chamber.

In order to achieve proper hot air guiding through the interior of the cooking chamber, the outlets (14), (15) and (16) through which the hot air enters the cooking chamber (2) are provided with independent amplitude adjustment means; thus, all outlets incorporate a fixed side (18) and a movable side composed of a plate (19) which allows for outlet amplitude variations and corresponding exit stream speed variations; both the fixed side and the movable side are provided with a flow directing fin (20).

Cooking chamber inlets (3) incorporate an external peripheral frame (21) provided, on its vertical stretches, with outlets (22) spanning the total height of the frame; through these openings (22) air at ambient temperature emerges which is collected from the external environment and is impelled towards each of the frames (21) by a corresponding turbine (not shown), disposed above them.

The ambient temperature air outlets (22) incorporate amplitude adjustment means similar to that of the hot air outlets, and are provided with flow directing means oriented slightly towards the interior of the cooking chamber (2).

The cooking chamber (2) is delimited in inlets (3) by means of transparent protection plates (23), preferably disposed between the peripheral inner hot air streams and outer ambient temperature air streams. The purpose of the ambient temperature air curtains is to prevent the heating of the protection plates (23).

Oven operation is controlled through an externally disposed control panel (24) which electronically and automatically causes the turbine to stop for a preset period of time immediately after steam enters the chamber by means of the humidifying chamber (8), thereby making the steam to be deposited inside the oven and thus eliminating almost totally the emission of steam to the exterior.

This oven incorporates a natural decompression outlet (25) and a forced flow outlet (26), in the usual manner.

I claim:

1. A convection air oven comprising a polygonal base housing, an internal cooking chamber having a rotating plate, heater means for heating hot air inside the oven and impeller means for circulating the hot air inside the oven, the cooking chamber being open on two opposite sides and defined by first and second opposing walls, said first wall defining an inlet for the air circulating towards the heater means, where the air is heated and impelled by said impeller means towards a duct communicating with a cavity located behind the second wall of the cooking chamber, said first and second walls including a plurality of dimensionally adjustable cooking chamber outlets through which the hot air emerges to be distributed throughout the interior of the cooking chamber, said first and second walls having a shape and said outlets being arranged so as to evenly distribute hot air within the cooking chamber and guide the hot air towards the inlet, wherein the first wall includes adjustable amplitude vertical outlets proximate oven entrance doors, and through which peripheral hot air streams emerge and slightly converge towards the interior of the cooking chamber.

2. A convection air oven comprising a polygonal base housing, an internal cooking chamber having a rotating plate, heater means for heating hot air inside the oven and impeller means for circulating the hot air inside the oven, the cooking chamber being open on two opposite sides and defined by first and second opposing walls, said first wall defining an inlet for the air circulating towards the heater means, where the air is heated and impelled by said impeller means toward a duct communicating with a cavity located behind the second wall of the cooking chamber, said first and second walls including a plurality of dimensionally adjustable cooking chamber outlets through which the hot air emerges to be distributed throughout the interior of the cooking chamber, said first and second walls having a shape and said outlets being arranged so as to evenly distribute hot air within the cooking chamber and guide the hot air towards the inlet, wherein said first wall includes adjustable amplitude vertical outlets through which emerges hot air coming from the duct to form hot air streams within the cooking chamber which delimit a main stream circulating in the opposite direction and, with the help of suction generated by the impeller means, guides the main stream towards the inlet to the heater means.

3. An oven according to claim 1 or claim 2, wherein each adjustable amplitude vertical outlet is defined by a fixed side having a first protruding fin and a movable side having a second protruding fin parallel to the first fin for amplitude adjustment of the outlet.

4. An oven according to claim 1 or 2, wherein the impeller means includes a turbine disposed above the heater means to suck hot air and impel the hot air through the duct.

5. An oven according to claim 1 or 2, wherein the first and second walls include a recessed central area of a trapezoid shape and sides which converge towards the central area of the walls to guide hot air towards the inlet of the first wall and from the outlets of the second wall.

6. An oven according to claim 5, further comprising a humidifying chamber proximate an upper portion of the central area of the first wall and attached to the heater means, and an air outlet hole proximate a lower portion of the central area for directing hot air towards the heater means.

7. An oven according to claim 6, further comprising an external electric control panel which causes the impeller means turbine to stop automatically after a preset period of time on completion of vaporization inside the cooking chamber by the humidifying chamber to prevent the emission of steam to the exterior.

8. An oven according to claim 1, wherein the oven entrance doors include an external frame having outer ambient temperature outlets, and vertical grooves facing each other to form air curtains which converge slightly towards the inner area of the oven and which impinge on transparent protection plates located at each oven entrance door between the adjustable amplitude vertical outlets and the outer ambient temperature outlets.

9. An oven according to claim 1, further comprising external protection plates proximate the oven entrance doors, wherein ambient temperature air curtains are directed on said plates, said curtains emerge through outer ambient temperature outlets proximate each of the oven entrance doors.

10. An oven according to claim 8 or 9, wherein each of the outer ambient temperature outlets include amplitude adjustment means having a fixed side with a first protruding fin and a movable side with a second protruding fin parallel to the first fin.

* * * * *